United States Patent
Rogers (10) Patent No.: US 11,506,441 B2
(45) Date of Patent: Nov. 22, 2022

(54) COOLING DEVICE AND METHODS OF FORMING AND REGENERATING SAME

(71) Applicant: Cronin Group Pty Ltd, Weatherill Park (AU)

(72) Inventor: Benjamin Charles Rogers, Glendale (AU)

(73) Assignee: Cronin Group Pty Ltd, Weatherill Park (AU)

( * ) Notice: Subject to any disclaimer, the term of this patent is extended or adjusted under 35 U.S.C. 154(b) by 302 days.

(21) Appl. No.: 16/956,097

(22) PCT Filed: Dec. 20, 2018

(86) PCT No.: PCT/AU2018/051373
§ 371 (c)(1),
(2) Date: Jun. 19, 2020

(87) PCT Pub. No.: WO2019/119051
PCT Pub. Date: Jun. 27, 2019

(65) Prior Publication Data
US 2021/0070449 A1    Mar. 11, 2021

(30) Foreign Application Priority Data
Dec. 22, 2017   (AU) .............................. 2017905166

(51) Int. Cl.
*C09K 5/06* (2006.01)
*C09K 5/20* (2006.01)
(Continued)

(52) U.S. Cl.
CPC ............ *F25D 3/08* (2013.01); *B64D 11/0007* (2013.01); *B64D 11/04* (2013.01); *C09K 5/066* (2013.01);
(Continued)

(58) Field of Classification Search
CPC .. C09K 5/06; C09K 5/066; C09K 5/20; F25D 3/06; F25D 3/08; F25D 2303/082; F25D 2303/084; F25D 2303/085
See application file for complete search history.

(56) References Cited

U.S. PATENT DOCUMENTS 4,404,820 A * 9/1983 Romaine ................... F25D 3/08
                                                            62/457.2
4,641,655 A * 2/1987 Abt ........................... A61F 7/10
                                                            607/109
(Continued)

FOREIGN PATENT DOCUMENTS

EP         46894 A1 *  3/1982
EP      2386811 A2    11/2011
(Continued)

*Primary Examiner* — Matthew R Diaz
(74) *Attorney, Agent, or Firm* — Fox Rothschild LLP (57) ABSTRACT

The present invention concerns a cooling device and method of forming and regenerating same for use in keeping perishable products cool. The cooling device includes a porous substrate that has been soaked in a first composition including at least one anti-freeze agent before being soaked in a second composition including at least one crosslinking agent and be exposed to UV irradiation. The cooling device further includes a substrate cover for sealingly covering the porous substrate after being soaked in the second composition and exposed to the UV irradiation. Prior to use, the cooling device is cooled to a desired temperature and exposed to further UV irradiation.

16 Claims, 8 Drawing Sheets

(51) Int. Cl.
*F25D 3/08* (2006.01)
*B64D 11/00* (2006.01)
*B64D 11/04* (2006.01)
*B64D 13/06* (2006.01)

(52) U.S. Cl.
CPC ............ *C09K 5/20* (2013.01); *B62B 2202/67* (2013.01); *B64D 2013/0629* (2013.01); *F25D 2303/082* (2013.01); *F25D 2303/084* (2013.01); *F25D 2303/085* (2013.01)

(56) References Cited

U.S. PATENT DOCUMENTS

| | | | | |
|---|---|---|---|---|
| 4,700,706 A | * | 10/1987 | Munch | A61F 7/10 604/113 |
| 4,797,424 A | * | 1/1989 | Abt | C08J 9/40 264/28 |
| 5,375,688 A | * | 12/1994 | Hays | F16D 13/585 192/89.22 |
| 5,697,961 A | * | 12/1997 | Kiamil | A61F 7/02 62/530 |
| 6,984,339 B2 | * | 1/2006 | Uang | C09K 5/20 252/75 |
| 7,135,424 B2 | * | 11/2006 | Worley | A41D 31/065 428/206 |
| 8,443,623 B2 | * | 5/2013 | Matta | B65D 81/18 62/530 |
| 2005/0193760 A1 | | 9/2005 | Moran et al. | |
| 2008/0221260 A1 | | 9/2008 | Hermeling et al. | |
| 2009/0229593 A1 | * | 9/2009 | Komiya | F28D 20/02 126/263.01 |
| 2011/0034887 A1 | * | 2/2011 | Forden | D06M 15/333 607/114 |
| 2011/0307041 A1 | * | 12/2011 | Floyd | A61F 7/10 523/105 |
| 2018/0273819 A1 | * | 9/2018 | Sutterlin | C09K 5/063 |

FOREIGN PATENT DOCUMENTS

| | | | | |
|---|---|---|---|---|
| FR | 2847233 A1 | * | 5/2004 | ............ A61J 1/165 |
| GB | 2335972 A | * | 10/1999 | ............... F25D 3/08 |
| WO | WO-2009056296 A1 | * | 5/2009 | ............ F25D 3/107 |
| WO | 2016179028 A1 | | 11/2016 | |
| WO | WO-2016179028 A1 | * | 11/2016 | ............ C09K 5/063 |

* cited by examiner

COOLING DEVICE AND METHODS OF FORMING AND REGENERATING SAME

TECHNICAL FIELD

The present invention relates to a device for use in cooling perishable products and methods of forming and regenerating the device.

BACKGROUND

Dry ice is the solid form of carbon dioxide and is commonly used as a cooling agent for cooling perishable products, such as, e.g., food or biological samples, when mechanical cooling is not available. It provides an attractive alternative to other cooling agents, such as, e.g., water ice, since it has a lower temperature and does not leave any residue (other than incidental frost from moisture in the atmosphere).

For the above reasons, dry ice is commonly used in the aviation industry to keep food cool in airline or airplane food galleys during flights.

However, a problem with the above scenario is that dry ice is dangerous to handle without protection due to burns caused by freezing. Accordingly, it is not uncommon for flight attendants, cabin crew or catering staff to suffer burns due to mishaps when handling dry ice.

Moreover, another problem with the above scenario is that dry ice generally sublimes at room temperature and the outgassing from dry ice can cause hypercapnia (abnormally elevated carbon dioxide levels in the blood) due to the build-up of gaseous carbon dioxide in a confined space, such as, e.g., an airplane galley. Indeed, aircraft have been forced to make emergency landings due to elevated carbon dioxide levels in the cabin caused by the outgassing from dry ice in food carts.

Lastly, while dry ice is relatively easy to manufacture, it is a non-reusable cooling agent that accounts for up to 30% of non-food costs for airline catering companies. Dry ice is therefore a major expense for airline caterers and one that is very inefficient to order, transport and store thus presenting further problems.

SUMMARY OF INVENTION

Embodiments of the present invention provide a cooling device and methods of forming and regenerating same, which may minimise or overcome at least one of the problems mentioned above, or which may provide the public with a useful or commercial choice.

According to a first aspect of the present invention, there is provided a cooling device for use in keeping perishable products cool, said device including:

a porous substrate that has been soaked in a composition including at least one anti-freeze agent and at least one crosslinking agent prior to being exposed to UV irradiation; and a substrate cover for sealingly covering the porous substrate after being soaked in the composition and being exposed to said UV irradiation, wherein said cooling device is cooled to a desired temperature prior to use.

According to a second aspect of the present invention, there is provided a cooling device for use in keeping perishable products cool, said device including:

a porous substrate that has been soaked in a first composition including at least one anti-freeze agent before being soaked in a second composition including at least one crosslinking agent and being exposed to UV irradiation; and a substrate cover for sealingly covering the porous substrate after being soaked in said second composition and being exposed to said UV irradiation, wherein said cooling device is cooled to a desired temperature prior to use.

Advantageously, the cooling device of the present invention provides a safe, cost-effective and more efficient cooling solution to the use of conventional dry ice. The cooling device does not sublime and therefore does not pose a safety risk due to the outgassing of carbon dioxide in a confined spaced over any extended period of time. Moreover, unlike dry ice, the cooling device of the present invention may be re-generated and re-used repeatedly thus providing a more efficient cooling solution for large scale users, such as, e.g., the airline industry. Lastly, the cooling device by, among other things, being rapidly cooled has a greater latent heat transfer than conventional dry ice and therefore provides a more efficient cooling solution.

As indicated above, the cooling device includes a porous substrate that is soaked in a composition or compositions before being exposed to UV irradiation. The porous substrate may be of any suitable size, shape and construction and formed from any suitable material or materials.

Generally, the substrate may be formed from an absorbent material that is able to be cooled to a desired temperature, typically of about −80° C. or lower, preferably repeatedly.

For example, the substrate may be a sponge or a solid foam. In this regard, the substrate may be formed from natural or synthetic materials. The substrate may have a closed-cell or open-cell structure, preferably the latter.

In some embodiments, the substrate may be a solid foam formed from foamed synthetic materials, such as, e.g., plastic polymers. For example, the solid foam may be a poly(vinyl acetate) (PVA) foam sponge, a polyurethane foam sponge or a polyester foam sponge.

In preferred embodiments, the porous substrate may be an open-celled phenolic foam.

The porous substrate may have a spherical, ovoid or prism shape, preferably the latter. In some embodiments, the substrate may be a triangular, rectangular or polygonal-shaped prism.

In preferred embodiments, the porous substrate may be a rectangular-shaped prism.

The substrate may have a two opposed surfaces, including an upper surface and an opposed lower surface. The opposed surfaces may extend substantially parallel to one another and be interconnected by opposing edges. The opposing edges may include at least a pair of opposed side edges and a pair of opposed end edges.

Generally, the substrate may include rounded corners extending between adjacent side and end edges. Likewise, the substrate may include rounded edges at least between one of the opposed surfaces and adjacent side and/or end edges.

The substrate may be of unitary construction or may be formed from two or more substrate pieces, such as, e.g., two or more substrate layers.

The substrate may typically be formed by moulding.

As indicated above, in some embodiments, the substrate is soaked in a composition containing at least one anti-freeze agent and at least one crosslinking agent. In other embodiments, the substrate is soaked in a first composition containing the at least one anti-freeze agent and subsequently soaked in a second composition containing the at least one crosslinking agent.

The composition or first composition may include any suitable number, amount and type of anti-free agent.

The composition or first composition may preferably be an aqueous composition. The composition may be prepared by dissolving or mixing the at least one anti-freeze agent in water.

The at least one anti-freeze agent may include any suitable type of agent capable of depressing the freezing point of the composition or the first composition. For example, the anti-freeze agent may include ethanol, methanol, ethylene glycol, propylene glycol, polyethylene glycol, glycerol, urea, one or more salts, or any combination thereof. The one or more salts may include NaCl, $CaCl_2$), $MgCl_2$, and/or KCl.

In some embodiments, the first composition may include one anti-freeze agent. For example, the first composition may include water and NaCl. Any suitable amount of NaCl may be used to provide an effective anti-freeze solution.

In one such embodiment, the composition or the first composition may include a single anti-freeze agent being NaCl at a concentration of from about 0.5 wt % to about 10 wt %.

In other embodiments, the composition or the first composition may include more than one anti-freeze agent. For example, the composition may include two, three, four or even five anti-freeze agents.

In one such embodiment, the composition or the first composition may include NaCl and propylene glycol as anti-freeze agents. The anti-freeze agents may be provided in the composition in any suitable amount to form an effective anti-freeze solution. For example, the composition may include NaCl at a concentration of from about 0.5 wt % to about 10 wt % and propylene glycol at a concentration of from about 0.1 wt % to about 10 wt %.

In another such embodiment, the composition or the first composition may include NaCl, propylene glycol and glycerol as anti-freeze agents. Again, the anti-freeze agents may be provided in the composition in any suitable amount to form an effective anti-freeze solution. For example, the composition may include NaCl at a concentration of from about 0.5 wt % to about 10 wt %, propylene glycol at a concentration of from about 0.1 wt % to about 10 wt % and glycerol at a concentration of from about 0.1 wt % to about 10 wt %.

In yet another such embodiment, the composition or the first composition may include NaCl, propylene glycol, glycerol and ethanol as anti-freeze agents. Again, the anti-freeze agents may be provided in the composition in any suitable amount to form an effective anti-freeze solution. For example, the composition may include NaCl at a concentration of from about 0.5 wt % to about 10 wt %, propylene glycol at a concentration of from about 0.1 wt % to about 10 wt %, glycerol at a concentration of from about 0.1 wt % to about 10 wt % and ethanol at a concentration of from about 0.1 wt % to about 10 wt %.

In preferred embodiments, the first composition may include NaCl, propylene glycol, glycerol and ethanol as anti-freeze agents. The first composition may include NaCl at a concentration of about 4 wt %, propylene glycol at a concentration of about 2 wt %, glycerol at a concentration of about 1 wt % and ethanol at concentration of about 1 wt %.

The porous substrate may be soaked in the composition or the first composition in any suitable way.

For example, in some embodiments, the porous substrate may be immersed in a solution of the composition or the first composition for a period of time.

In other embodiments, the porous substrate may be impregnated with the composition. In such embodiments, the porous substrate may be injected with the composition until the porous substrate is substantially saturated with the composition.

In some such embodiments, the porous substrate may include an inlet, an outlet and at least one internal circulation passageway configured to direct an injected composition from the inlet to the outlet along a tortuous passage extending between the opposed side edges and/or opposed end edges. The inlet and the outlet may be accessible from an end edge or side edge of the porous substrate.

Generally, the at least one internal circulation passageway may be part defined in upper and lower layers of the porous substrate that are joined together. In particular, the at least one internal circulation passageway may be part defined in each of the abutting surfaces of the layers such that when the layers are joined together the porous substrate and the at least one internal circulation passageway are formed.

The composition may be injected into the porous substrate in any suitable way. For example, the composition may be injected by a syringe or by pump. Likewise, the composition may be injected by hand or may be driven by an electric or mechanically-driven pump or actuator.

In some embodiments, once saturated with the first composition, the porous substrate may or may not be allowed to at least partially dry before being soaked in the second composition and being exposed to UV irradiation.

As indicated above, the composition and the second composition include at least one crosslinking agent for at least partially strengthening and stabilising the porous substrate when cross-linked after exposure to the UV irradiation. The composition and the second composition may include any suitable amount and type of crosslinking agent.

Again, the second composition, like the composition and the first composition, may be an aqueous composition. For example, the composition may be prepared by dissolving or mixing the at least one crosslinking agent in water.

The at least one crosslinking agent may include any suitable type of polymer or polymers capable of forming bonds or crosslinks with other polymers after exposure to the UV irradiation. For example, in some embodiments, the crosslinking agent may include a low molecular weight polyamines, such as, e.g., putrescine, cadaverine, spermidine and spermine. In other embodiments, the crosslinking agent may include poly(allylamine), polyethylene amine, ethylene diamine, 1-3-diaminopropane and hexamethylenediamine. Preferably, the at least one crosslinking agent may include spermidine.

In some embodiments, the composition or the second composition may include spermidine and/or spermine as crosslinking agents. The at least one crosslinking agents may be provided in the composition in any suitable amount. For example, the composition may include the crosslinking agent at a concentration of from about 0.1 wt % to about 20 wt %, typically from about 0.5 wt % to about 10 wt %, preferably from about 1 wt % to about 5 wt %.

In other embodiments, the composition or the second composition may further include one or more other agents.

For example, in some such embodiments, the composition or the second composition may further include an aluminosilicate agent, such as, e.g., zeolites. The aluminosilicate agent may be synthetic or naturally occurring and may be present in the second composition in any suitable amount. The aluminosilicate agent may act as a catalyst and assist the crosslinking agent in crosslinking. The aluminosilicate agent may further act as a heat absorber and thereby assist in enhancing latent heat transfer of the cooling device. The aluminosilicate agent may enhance the heat capacity of the composition or the second composition and thereby the porous substrate.

The aluminosilicate agent may be present in the composition or the second composition in any suitable amount. For example, in one such embodiment, the composition may include the aluminosilicate agent at a concentration of from about 0.05 wt % to about 1.0 wt %, typically from about 0.05 wt % to about 0.5 wt %, preferably from about 0.1 wt % to about 0.5 wt %.

In some other such embodiments, the composition or the second composition may further include icilin. The icilin may be present in the composition in any suitable amount. The inventor has found that the presence of icilin in the composition and thus the porous substrate at least partially enhances the latent heat transfer of the cooling device. In particular, the inventor has found that icilin may potentiate the effects of the aluminosilicate agent in absorbing heat.

The icilin may be present in the composition or the second composition in any suitable amount. For example, in such an embodiment, the composition or the second composition may include icilin at a concentration of from about 0.001 wt % to about 1 wt %, typically from about 0.001 wt % to about 0.1 wt %, preferably from about 0.001 wt % to about 0.01 wt %.

In preferred embodiments, the composition may include NaCl, propylene glycol, glycerol, ethanol, spermidine as the at least one crosslinking agent, zeolites as the aluminosilicate agent and icilin. The composition may include NaCl at a concentration of about 4 wt %, propylene glycol at a concentration of about 2 wt %, glycerol at a concentration of about 1 wt %, ethanol at concentration of about 1 wt %, spermidine at a concentration of about 1.6 wt %, zeolite at a concentration of about 0.397 wt % and Icilin at a concentration of about 0.003 wt %.

In preferred embodiments, the second composition may include spermidine as the at least one crosslinking agent, zeolites as the aluminosilicate agent and Icilin. The second composition may include spermidine at a concentration of about 1.6 wt %, zeolite at a concentration of about 0.397 wt % and Icilin at a concentration of about 0.003 wt %.

Like with the first composition or the composition as described above, the porous substrate may be soaked in the second composite in any suitable way.

For example, in some embodiments, the porous substrate may be immersed in a solution of the second composition for a period of time.

In other embodiments, the porous substrate may be impregnated with the second composition. In such embodiments, the porous substrate may be injected with the second composition until the porous substrate is substantially saturated with the second composition.

In preferred embodiments, the second composition may be injected via the inlet into the at least one internal circulation passageway of the porous substrate. The second composition may be injected by syringe or by a pump. Likewise, the second composition may be injected by hand or may be driven by an electric or mechanically-driven pump or actuator.

The second composition may be injected continuously into the porous substrate or may be injected periodically in doses into the porous substrate, preferably the latter.

In some embodiments, the porous substrate may be soaked in the second composition and exposed to the UV irradiation simultaneously. In preferred embodiments, however, the porous substrate may be exposed to the UV irradiation after being soaked in the second composition.

Generally, the porous substrate is exposed to UV irradiation within a sterile environment. Typically, the porous substrate may be placed within a chamber having a UV light source capable of emitting UV irradiation. The porous substrate may be exposed to the UV irradiation for any suitable period of time for at least a crosslinking reaction to occur. For example, the porous substrate may be exposed to UV irradiation for about 1 min, about 2 mins, about 3 mins, about 4 mins, about 5 mins, about 10 mins, about 15 mins, about 20 mins, about 25 mins, about 30 mins, about 35 mins, about 40 mins, about 45 mins, about 50 mins, about 55 mins, about 1 hour, about 1.5 hours, about 2 hours, about 2.5 hours, about 3 hours, about 3.5 hours or even about 4 hours. Typically, the porous substrate may be exposed to the UV irradiation for about 30 mins to about 4 hours.

In some embodiments, the chamber may be a sealed chamber.

In some such embodiments, the chamber may include an air ionizer for ionizing chamber air. In other such embodiments, the chamber may be supplied ionized air via an air circulation system connected to an air ionizer.

As indicated above, the porous substrate after being soaked in the second composition and exposed to UV irradiation is then sealingly covered by the substrate cover to obtain a sealed substrate. The substrate cover may be of any suitable size, shape and construction and formed from any suitable material or materials.

Generally, the substrate cover may be formed from material or materials that are substantially impermeable and enable high thermal conductivity.

Typically, the substrate cover may be in the form of a film sized and shaped to be wrapped about the porous substrate and then sealed, preferably vacuum and heat sealed.

The film may include any suitable thermoplastic polymer, such as, e.g., polyethylene telephthalate (PET).

In preferred embodiments, the substrate cover may be in the form of a metallised film in which the film formed from polyethylene telephthalate (PET) is coated with a thin layer of metal, preferably aluminium.

In some embodiments, the metallised film may further include or be partially formed from polyamine (spermine) and/or a polyurethane adhesive (the latter for sealing the film once wrapped around the porous substrate).

In some embodiments, the metallised film may include one or more transparent windows in the thin layer of metal to permit UV irradiation through for interaction with the porous substrate while being cooled. In preferred embodiments, the one or more transparent windows may be in the form of a plurality of pin hole sized windows.

In some embodiments, the metallised film may include or be partially formed from photoconductive polymers configured to absorb electromagnetic radiation and produce an increase of electrical conductivity of the substrate cover.

Any suitable type of photoconductive polymer may be used. For example, the photoconductive polymers may include negative photoconductive polymers, magnetic photoconductive polymers or a combination thereof. In preferred embodiments, the metallised film may include photoconductive polymers being poly(vinylcarbazole).

Generally, the porous substrate may be wrapped and sealed in the substrate cover in a sterile environment. For example, in some embodiments, a sealed chamber that may include an air ionizer for ionizing chamber air or may be supplied ionized air via an air circulation system connected to an air ionizer.

As indicated above, the porous substrate having been sealingly covered to obtain the sealed substrate, is then cooled to a desired temperature.

Generally, the desired temperature may be a temperature at which the sealed substrate undergoes a phase transition into a substantially solid state. Typically, the sealed substrate may be cooled to a temperature of about −80° C. or lower. For example, the sealed substrate may be cooed to a temperate of about −90° C., about −100° C., about −110° C., about −120° C., about −130° C., about −140° C., about −150° C., about −160° C., about −170° C., about −180° C., about −190° C. or even about −200° C.

The sealed substrate may be cooled in any suitable way. For example, in some embodiments, the sealed substrate may be cooled with liquid nitrogen. In other embodiments, the porous substrate may be cooled prior to being sealingly covered. For example, the porous substrate may be cooled by a freeze spray directed along the at least one internal circulation passageway.

Typically, however, the sealed substrate may be cooled with a freezer, preferably rapidly cooled.

As indicated above, the sealed substrate is generally cooled until it undergoes a phase transition into a solid state, preferably a non-crystalline amorphous solid. A person skilled in the art will appreciate that by rapidly cooling the sealed substrate, any of the soaked compositions present may be supercooled and may then pass through a glass transition to form a vitrified solid. It will be appreciated by promoting the formation of a non-crystalline amorphous solid, elementary bonding becomes higher thus advantageously enhancing latent heat transfer of the cooling device.

Generally, the sealed substrate may be cooled for a set period of time suitable for the phase transition to occur. This period of time may range from about 1 hour to about 12 hours. For example, the sealed substrate may be cooled for about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, about 10.5 hours, about 11 hours, about 11.5 hours or even about 12 hours.

In some embodiments, the sealed substrate may be exposed to further UV irradiation when being cooled.

Generally, in such embodiments, the freezer may include a UV light source capable of emitting UV irradiation.

In such embodiments, the UV irradiation may be continuous or may be emitted periodically in doses. In relation to the latter, the UV irradiation may be emitted in pulses of any period of time. For example, the UV irradiation may be emitted in pulses ranging in time from about 1 s to about 5 mins.

The sealed substrate may be exposed to the further UV irradiation for the entire time it is cooled or for a shorter period of time.

In some embodiments, the freezer may be a sterile environment.

In some embodiments, the freezer may include an air ionizer for ionizing internal freezer air. In other such embodiments, the freezer may be supplied ionized air via an air circulation system connected to an air ionizer.

In some embodiments, the freezer may include one or more electromagnets for generating a magnetic field within the freezer.

Advantageously, the use of an air ionizer or ionized air during the first round of UV irradiation and when cooling may at least partially assist in promoting the supercooling of the sealed substrate by removing or preventing possible nucleation sites and thereby the formation of ice crystals.

Moreover, the photoconductive polymers in the substrate cover may become negatively charged while being exposed to the second round of UV irradiation, which, in turn, may lower the freezing point of adjacent internal water molecules and thereby at least partially retard the outer surface of the sealed substrate undergoing phase transition relative to a remainder of the sealed substrate when being cooled.

According to a third aspect of the present invention, there is provided a method of preparing a cooling device for use in keeping perishable products cool, said method including:

soaking a porous substrate in a composition including at least one anti-freeze agent and at least one crosslinking agent;

exposing said porous substrate to UV irradiation;

sealing said substrate in a substrate cover to obtain a sealed substrate; and cooling said sealed substrate to a desired temperature prior to use.

According to a fourth aspect of the present invention, there is provided a method of preparing a cooling device for use in keeping perishable products cool, said method including:

soaking a porous substrate in a first composition including at least one anti-freeze agent;

soaking said porous substrate in a second composition including at least one crosslinking agent;

exposing said porous substrate to UV irradiation;

sealing said substrate in a substrate cover to obtain a sealed substrate; and cooling said sealed substrate to a desired temperature prior to use.

The method of the third or fourth aspects may include one or more characteristics and features of the cooling device as hereinbefore described.

In some embodiments, the soaking may include impregnating the porous substrate with the composition until the porous substrate is substantially saturated.

In other embodiments, the soaking may include impregnating the porous substrate with the first composition and then the second composition until the porous substrate is substantially saturated, preferably with the first composition and then the second composition.

Generally, the soaking and exposing to the UV irradiation may occur in a sterile environment. Typically, the porous substrate may be exposed to the irradiation after being soaked in the composition or the second composition, preferably for a period of time ranging from about 30 mins to about 4 hours.

The sealing may include wrapping and sealing the porous substrate in a film, preferably a metallised film. Preferably, the porous substrate may be vacuum and heat sealed in the film.

The cooling may typically include rapidly cooling the sealed substrate until the sealed substrate undergoes phase transition into a solid state, preferably into a non-crystalline amorphous solid.

In some embodiments, the sealed substrate may be exposed to a second round of UV irradiation while being cooled, preferably simultaneously. In such embodiments, the cooling and exposing may preferably occur in a freezer including a UV light source capable of emitting UV irradiation.

The sealed substrate may generally be cooled to a temperature of about −80° C. or lower.

According to a fifth aspect of the present invention, there is provided a cooling device when formed by the method of the third or fourth aspects.

According to a sixth aspect of the present invention, there is provided a method of regenerating a used cooling device for re-use in keeping perishable products cool, said method including:

re-cooling the cooling device of the first, second or fifth aspect to a desired temperature and optionally exposing the device to UV irradiation.

Again, the method may include one or more characteristics and features of the cooling device as hereinbefore described.

The re-cooling may typically include rapidly cooling the used cooling device until it undergoes phase transition back into a solid state, preferably a non-crystalline amorphous solid.

In some embodiments, the device may simultaneously be exposed to UV irradiation while being re-cooled.

The used cooling device may generally be re-cooled to a temperature of about −80° C. or lower.

According to a sixth aspect of the present invention, there is provided a cooling device when regenerated by the method of the fifth aspect.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
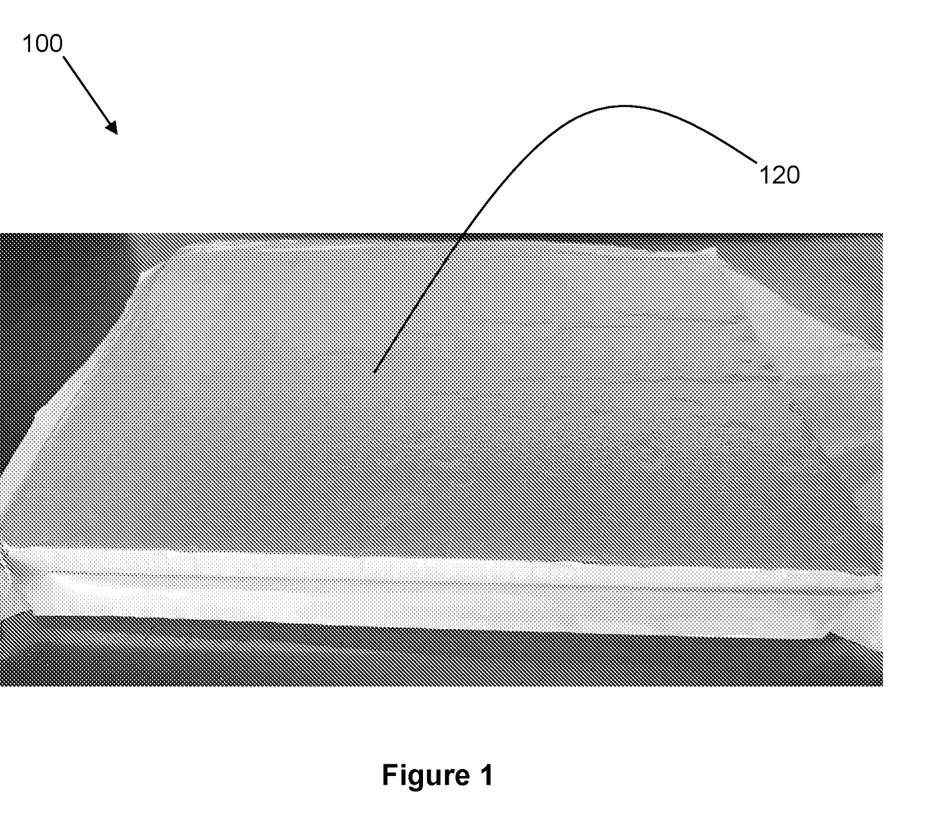
FIG. 1 is a photograph of a cooling device according to an embodiment of the present invention.

FIG. 1 shows a cooling device (100) according to an embodiment of the present invention.

The cooling device (100) is for use in keeping perishable products cool. The cooling device (100) includes: a porous substrate (210; visible in FIGS. 2 and 3) that has been impregnated with a first composition including anti-freeze agents before being impregnated with a second composition including at least one crosslinking agent and being exposed to UV irradiation; and a substrate cover in the form of a metallised film (120) for sealingly covering the porous substrate (210; visible in FIGS. 2 and 3). Prior to use, the cooling device (100) is rapidly cooled to about −80° C. or lower.

Figure 2:
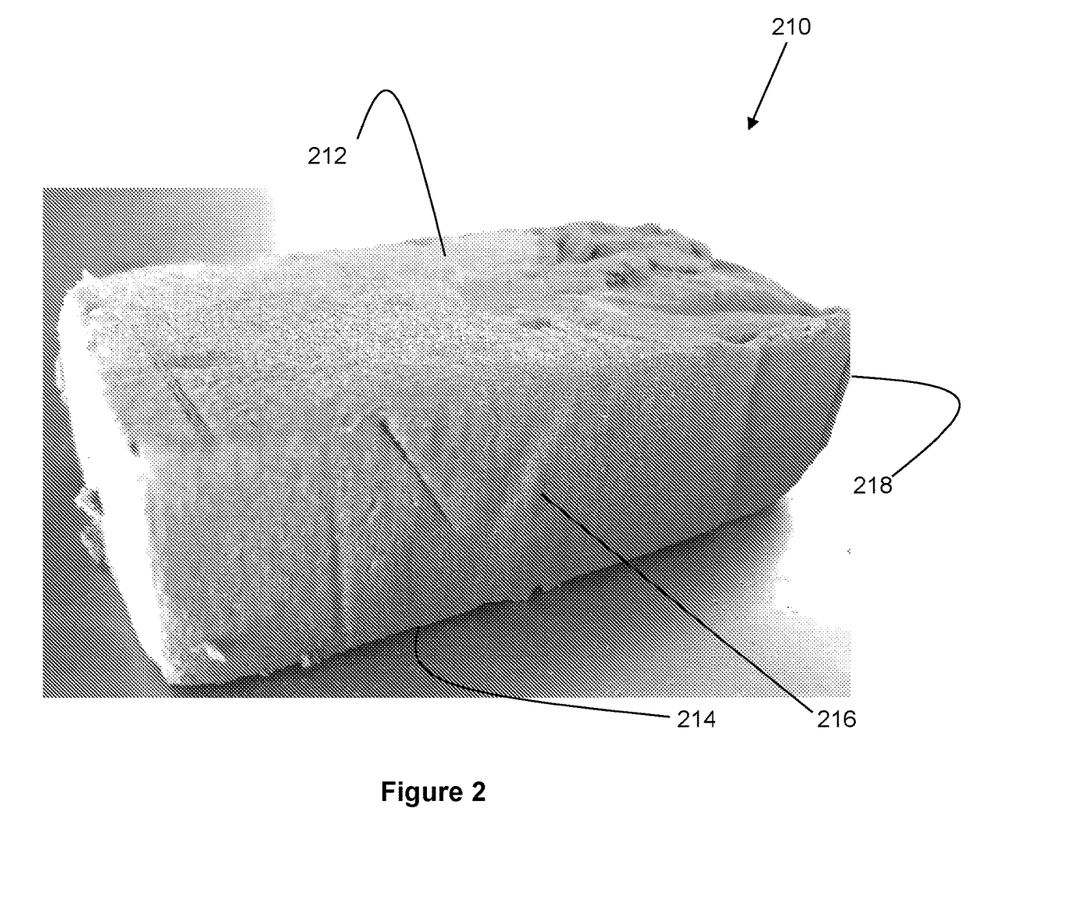
FIG. 2 is a photograph of a porous substrate of the cooling device as shown in FIG. 1 with a substrate cover removed.

Referring to FIG. 2, the porous substrate (210) is formed from phenolic foam and is in the shape of a rectangular prism.

The porous substrate (210) has two opposed surfaces, including an upper surface (212) and an opposed lower surface (214). The opposed surfaces extend substantially parallel to one another and are interconnected by opposing edges. The opposing edges include a pair of opposed side edges (216) and a pair of opposed end edges (218).

Figure 3:
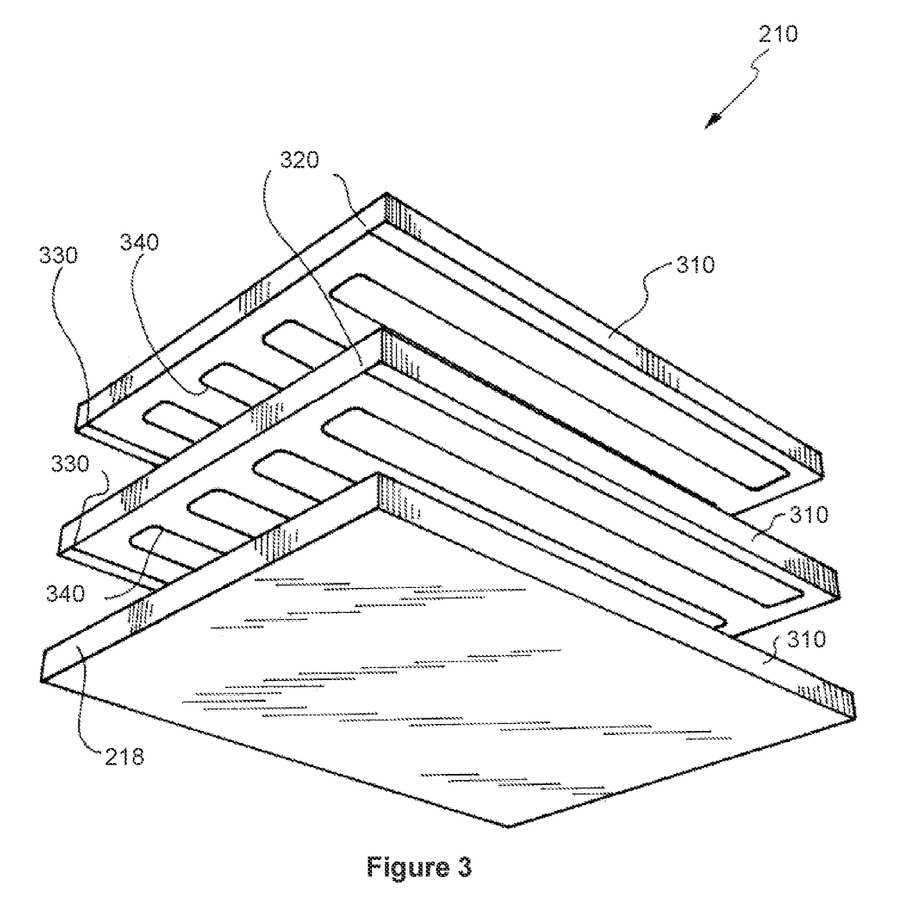
FIG. 3 is a schematic showing an exploded view of the porous substrate as shown in FIG. 2.

Turning briefly to FIG. 3, the substrate (210) is formed from three substrate layers (310) joined together.

As shown, the porous substrate (210) includes two inlets (320), two outlets (330) two internal circulation passageways (340) each configured to direct an injected composition from its respective inlet (320) to its respective outlet (330) along a tortuous passage extending between the opposed side edges (216) and opposed end edges (218). The inlets (320) and the outlets (330) are accessible from a common end edge (218).

Each of the internal circulation passageways (340) are partly defined by the three substrate layers (310) of the porous substrate (210).

Turning back to FIG. 1, the substrate (210; visible in FIGS. 2 and 3) is impregnated with a first composition including the following:

| Ingredient | Amount (wt %) |
| --- | --- |
| water | 92 |
| NaCl | 4.0 |
| propylene glycol | 2.0 |
| glycerol | 1.0 |
| ethanol | 1.0 |

The first composition is injected into the porous substrate (210; visible in FIGS. 2 and 3) via the respective inlets (320; visible in FIG. 3) by a syringe or by a pump.

Once saturated with the first composition, the porous substrate (210; visible in FIGS. 2 and 3) is then impregnated with a second composition including the following:

| Ingredient | Amount (wt %) |
| --- | --- |
| water | |
| polyamine (spermidine) | 1.6 |
| Aluminium silicate (zeolite) | 0.397 |
| icilin | 0.003 |

Like with the first composition, the second composition is injected into the porous substrate (210; visible in FIGS. 2 and 3) via the respective inlets (320; visible in FIG. 3) by a syringe or by a pump.

Once saturated with the second composition, the porous substrate (210; visible in FIGS. 2 and 3) is exposed to UV irradiation.

In this regard, the porous substrate (210; visible in FIGS. 2 and 3) is placed within a sterile chamber having a UV light source capable of emitting UV irradiation. The porous substrate (210; visible in FIGS. 2 and 3) is exposed to the UV irradiation for a period of about four hours.

The porous substrate (210; visible in FIGS. 2 and 3) is then sealingly covered by the substrate cover in the form of the metallised film (120) to obtain a sealed substrate.

The metallised film (120) is sized and shaped to be wrapped about the porous substrate (210; visible in FIGS. 2 and 3) and then vacuum and heat sealed.

The metallised film (120) includes a thermoplastic polymer (polyethylene telephthalate (PET)), an aluminium coating, and a polyurethane adhesive (for sealing the film once wrapped around the porous substrate).

In some embodiments, the metallised film (120) further includes a polyamine (spermine) and a photoconductive polymer (poly(vinylcarbazole)).

In some embodiments, the metallised film (120) further includes a plurality of pin hole-sized transparent windows (not visible) in the aluminium coating to, in use, admit UV irradiation for interaction with the underlying porous substrate (210; visible in FIGS. 2 and 3) to enable further crosslinking to occur when being cooled.

In use, the photoconductive polymers are configured to absorb the UV irradiation and produce an increase of electrical conductivity of the metallised film (120).

As with the impregnation, the porous substrate (210; visible in FIGS. 2 and 3) is wrapped and sealed in the metallised film (120) in the sterile chamber.

Once sealingly covered in the metallised film (120), the cooling device (100) is rapidly cooled to about −80° C. or lower.

Figure 4:
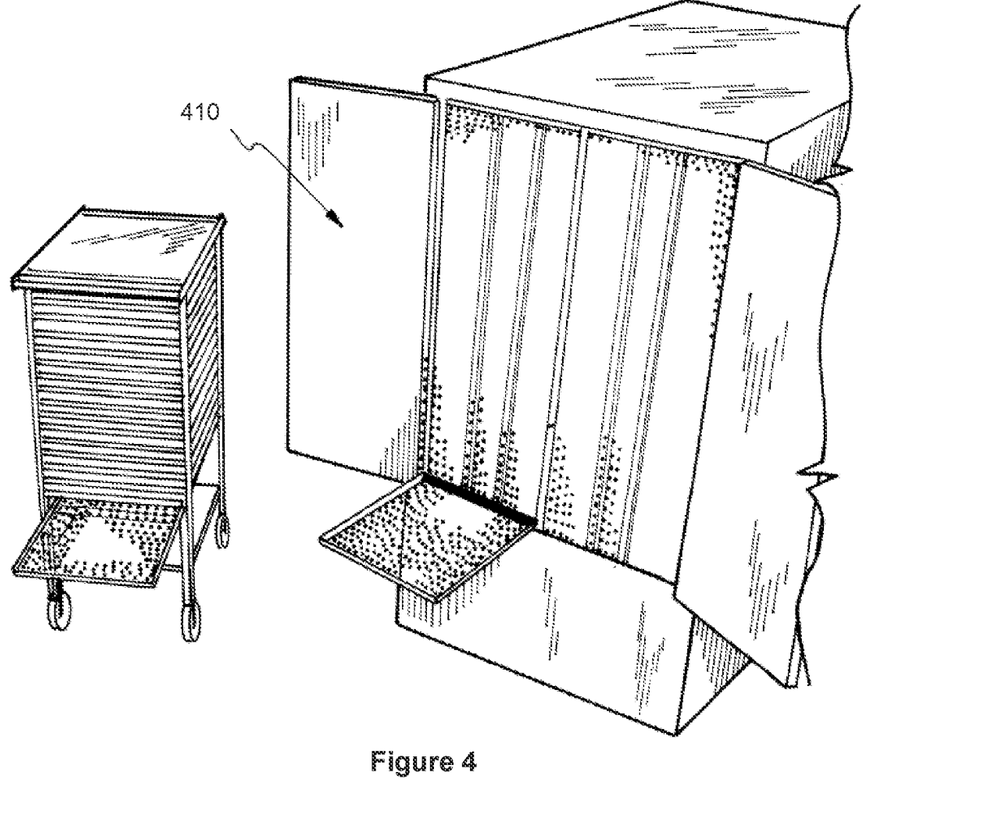
FIG. 4 is a schematic showing a freezer and associated trolley for respective use in cooling and transporting the cooling device as shown in FIG. 1.

Referring to FIG. 4, the cooling device (100) is rapidly cooled in a freezer (410).

Advantageously, by rapidly cooling the cooling device (100), the soaked compositions are supercooled and pass through a glass transition to form a non-crystalline amorphous solid. By promoting the formation of a non-crystalline amorphous solid, elementary bonding becomes higher thus enhancing latent heat transfer of the cooling device (100).

The cooling device (100) is cooled to a temperature of about −80° or lower for a period of about 4 hours.

While cooling, the cooling device (100), in some embodiments, is simultaneously exposed to a second round of UV irradiation emitted periodically in pulses.

In such embodiments, the cooling device (100) is exposed to the second round of UV irradiation for the entire time it is cooled.

In some embodiments, the freezer (410) further includes an air ionizer for ionizing internal freezer air, or is supplied ionized air via an air circulation system connected to an air ionizer.

In some embodiments, the freezer (410) further includes one or more electro magnets for generating a magnetic field within the freezer (410).

Advantageously, the use of an air ionizer or ionized air during both the first and second rounds of UV irradiation and when cooling at least partially assists in promoting the supercooling of the cooling device by removing or preventing possible nucleation sites and thereby the formation of ice crystals.

Moreover, the photoconductive polymers in the metallised film (120; shown in FIG. 1) becomes negatively charged when being exposed to the second round of UV irradiation, which, in turn, is thought to lower the freezing point of adjacent internal water molecules and thereby at least partially retard the outer surface of the porous substrate (210; visible in FIGS. 2 and 3) undergoing phase transition to a non-crystalline amorphous solid relative to a remainder of the porous substrate (210; visible in FIGS. 2 and 3) when being cooled.

Figure 5:
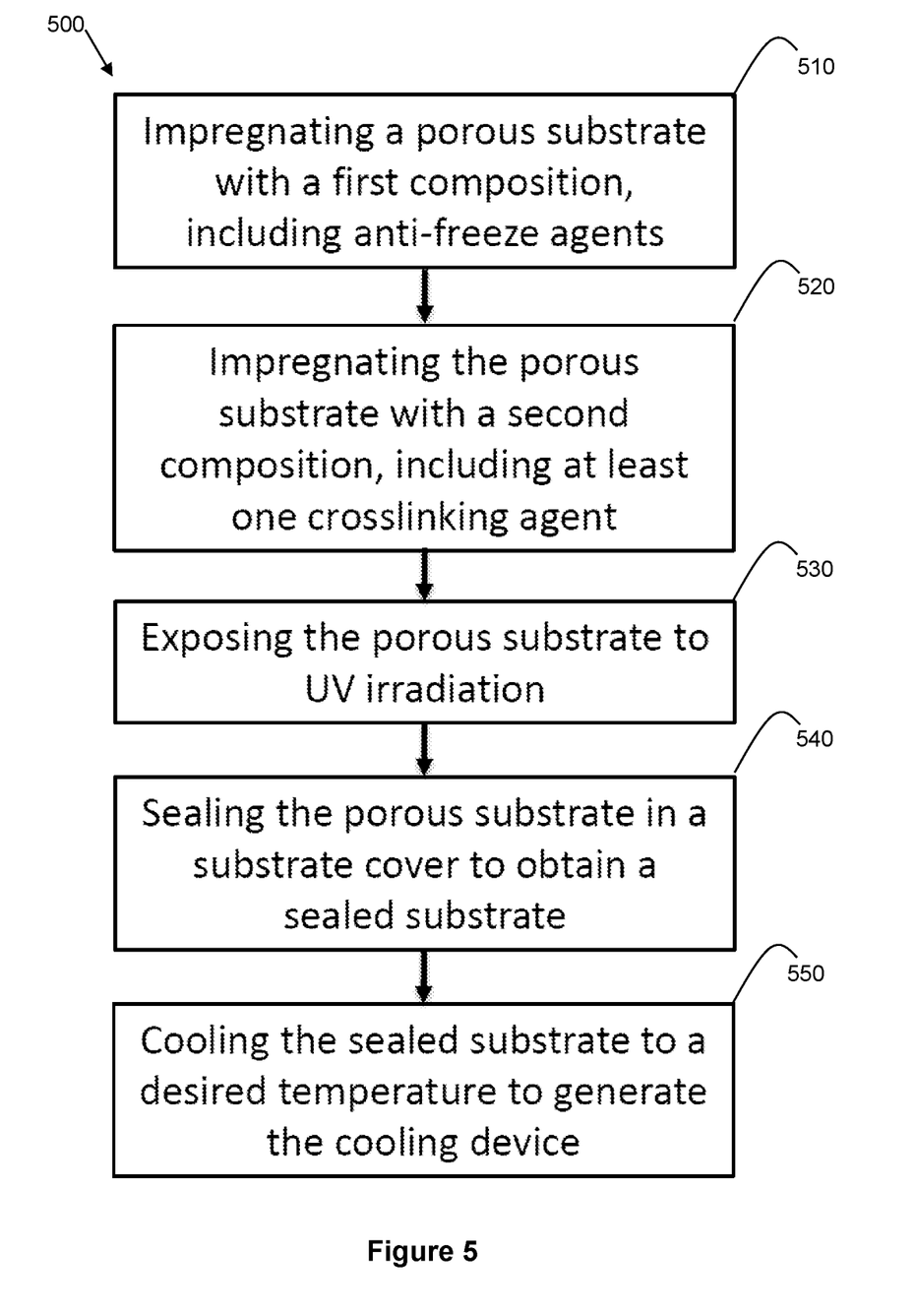
FIG. 5 is a flowchart showing steps in a method of forming the cooling device as shown in FIG. 1 according to an embodiment of the present invention.

A method (500) of forming the cooling device (100) as shown in FIG. 1 and partly in FIGS. 2 and 3 according to an embodiment of the present invention will now be described in detail with reference to FIG. 5.

At step 510, the porous substrate (210) is impregnated with the first composition including the anti-freeze agents. The porous substrate (210) is injected by syringe or pump with the first composition via the two inlets (320), two outlets (330) and two internal circulation passageways (340) each configured to direct the first composition from its respective inlet (320) to its respective outlet (330) along a tortuous passage extending between the opposed side edges (216) and opposed end edges (218).

At step 520, the porous substrate (210) is impregnated with the second composition including at least one crosslinking agent. The porous substrate (210) is injected by syringe or pump with second composition in the same manner as described above with step 510.

At step 530, the porous substrate (210) is placed within a sterile chamber having a UV light source capable of emitting UV irradiation. The porous substrate (210) is exposed to the UV irradiation for a period of about four hours. The UV irradiation causes the crosslinking agent in the second composition to crosslink with other polymers.

At step 540, the porous substrate (210) is sealingly covered by the substrate cover in the form of the metallised film (120) to obtain a sealed substrate.

The metallised film (120) is sized and shaped to be wrapped about the porous substrate (210) and then vacuum and heat sealed.

As with the impregnation, the porous substrate (210) is wrapped and sealed in the metallised film (120) in the sterile chamber.

At step 550, the sealed substrate is placed in the freezer (410) and rapidly cooled to a temperature of about −80° C. or lower to form the cooling device (100).

The sealed substrate is rapidly cooled for a period of about 4 hours.

The cooling device (100) is then ready for use.

Figure 6:
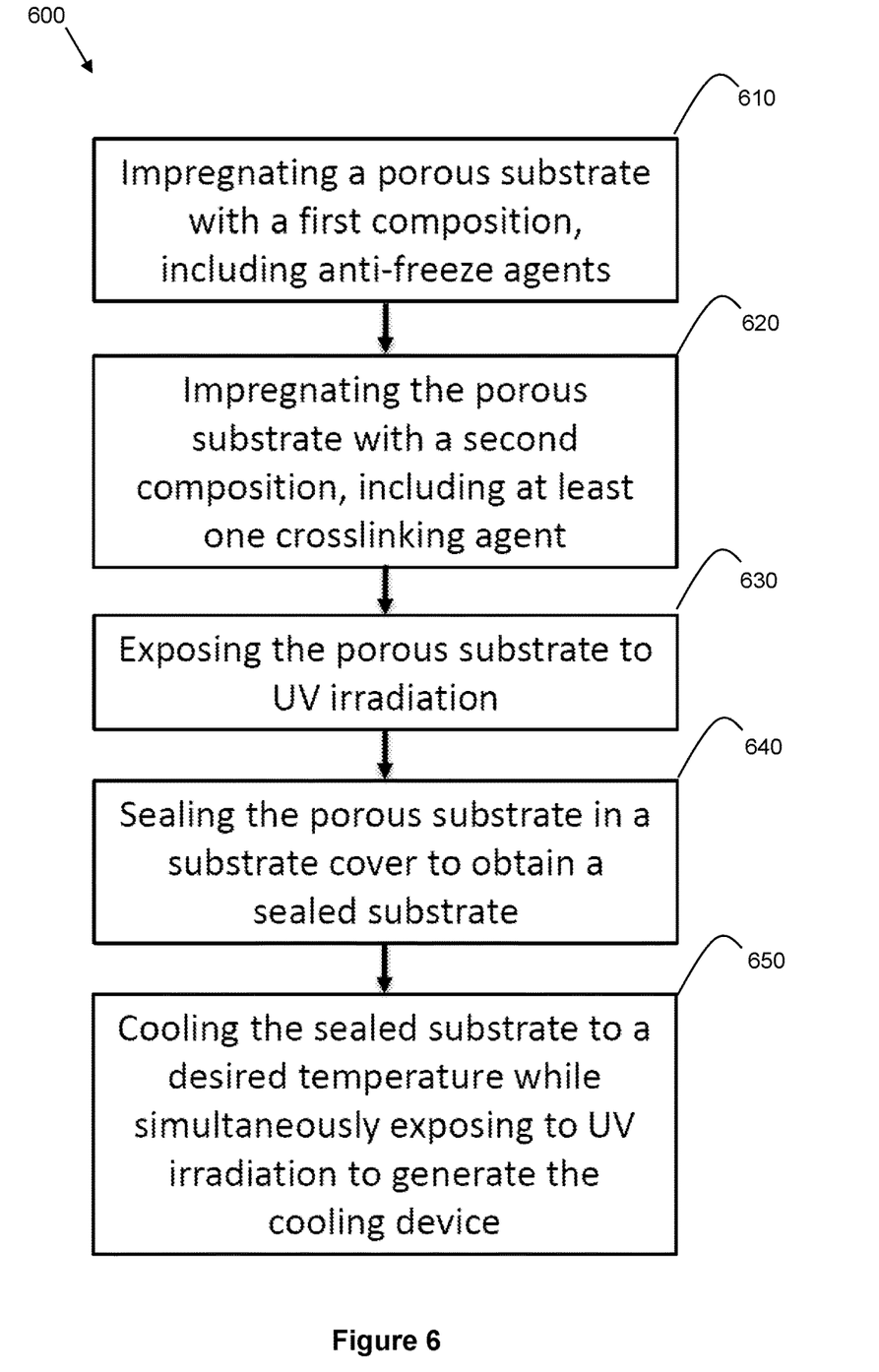
FIG. 6 is a flowchart showing steps in a method of forming the cooling device as shown in FIG. 1 according to another embodiment of the present invention.

A method (600) of forming the cooling device (100) as shown in FIG. 1 and partly in FIGS. 2 and 3 according to another embodiment will now be described in detail with reference to FIG. 6.

Steps 610-640 are identical to steps 510-540 as described above.

At step 650, the sealed substrate is placed in the freezer (410) and rapidly cooled to a temperature of about −80° C. or lower while being exposed to the second round of UV irradiation to form the cooling device (100).

The sealed substrate is rapidly cooled and exposed to UV irradiation for a period of about 4 hours.

The cooling device (100) is then ready for use.

Figure 7:
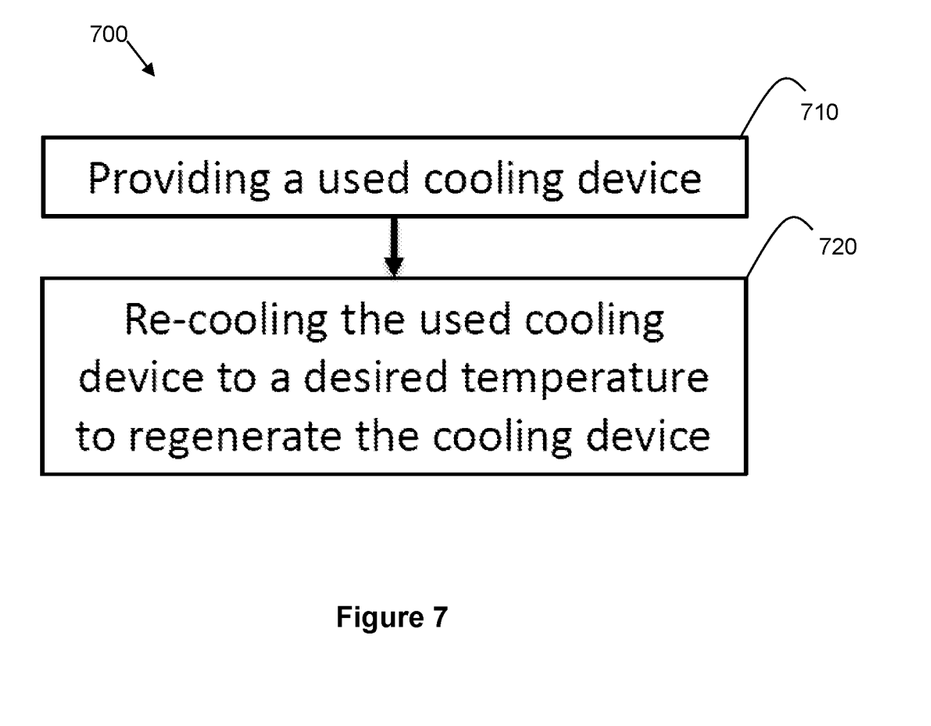
FIG. 7 is a flowchart showing steps in a method of regenerating the cooling device as shown in FIG. 1 for re-use according to an embodiment of the present invention.

A method (700) of regenerating a used cooling device (100) according to an embodiment of the present invention will now be described in detail with reference to FIG. 7.

At step 710, a used cooling device (100) is provided, obtained or collected. The used cooling device (100) will typically be at ambient or near ambient temperature.

At step 720, the used cooling device (100) is placed in the freezer (410) and rapidly re-cooled to a temperature of about −80° C. or lower to regenerate the cooling device (100).

The used cooling device (100) is rapidly re-cooled for a period of about 4 hours.

After step 720, the cooling device (100) is regenerated and ready to be re-used.

Figure 8:
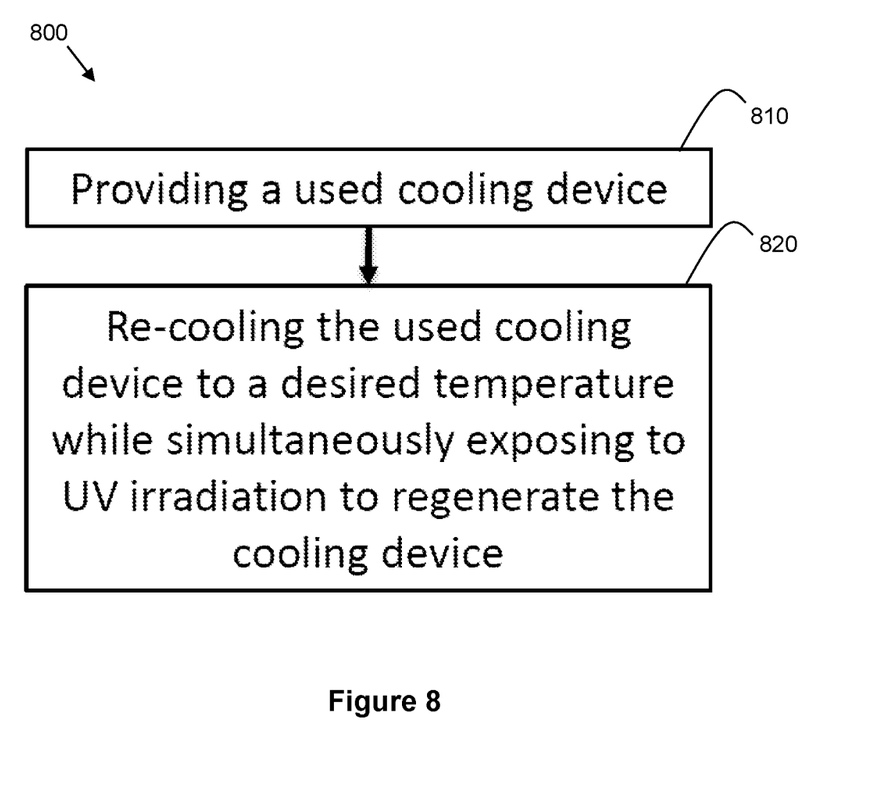
FIG. 8 is a flowchart showing steps in a method of regenerating the cooling device as shown in FIG. 1 for re-use according to another embodiment of the present invention.

A method (800) of regenerating a used cooling device (100) according to another embodiment of the present invention will now be described in detail with reference to FIG. 8.

At step 810, a used cooling device (100) is again provided, obtained or collected. The used cooling device (100) will typically be at ambient or near ambient temperature.

At step 820, the used cooling device (100) is placed in the freezer (410) and rapidly re-cooled to a temperature of about −80° C. or lower while being exposed to UV irradiation to regenerate the cooling device (100).

The used cooling device (100) is rapidly re-cooled and exposed to UV irradiation for a period of about 4 hours.

After step 820, the cooling device (100) is regenerated and ready to be re-used.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The following are examples of the practice of the invention. They are not to be construed as limiting the scope of the invention in any way.

EXAMPLES

Example 1: Formulation Screening

Exploratory formulation screening was conducted to identify key composition ingredients that enhance the length of time that the cooling device can maintain a temperature below 15° C.

Testing was carried out in an airplane food galley of aluminium construction and having dimensions of 800 mm length, 300 mm width and 900 mm height. The galley has a volume of 216 litres. The galley was fitted with a temperature probe (RC-4HC with 10 cm probe).

Cooling devices of the present invention were prepared with the following compositions prior to being cooled to −40° C. and −80° C., respectively, and then positioned on the second shelf of the galley. A conventional dry ice cooling device was also used as a comparative example.

TABLE 1

| Screened Compositions | | |
|---|---|---|
| Formulation No. | Ingredient | Amount (wt %) |
| 1 | water | 91.84 |
|  | NaCl | 3.06 |
|  | glycerol | 3.06 |
|  | ethanol | 2.04 |
| 2 | water | 93.88 |
|  | NaCl | 3.06 |
|  | glycerol | 3.06 |
| 3 | water | 93.88 |
|  | glycerol | 3.06 |
|  | ethanol | 3.06 |
| 4 | water | 96.94 |
|  | glycerol | 3.06 |
| 5 | water | 96.94 |
|  | propylene glycol | 3.06 |
| 6 | water | 91.84 |
|  | propylene glycol | 8.16 |
| 7 | water | 91.84 |
|  | NaCl | 8.16 |
| 8 | water | 91.84 |
|  | NaCl | 5.10 |
|  | glycerol | 3.06 |
| 9 | water | 86.74 |
|  | NaCl | 5.10 |
|  | propylene glycol | 4.08 |
|  | glycerol | 4.08 |
| 10 | water | 89.80 |
|  | NaCl | 5.10 |
|  | propylene glycol | 2.04 |
|  | glycerol | 1.53 |
|  | ethanol | 1.53 |
| 11 | water | 92.30 |
|  | NaCl | 4.10 |
|  | propylene glycol | 1.54 |
|  | glycerol | 1.03 |
|  | ethanol | 1.03 |
| 12 | water | 88.57 |
|  | NaCl | 3.94 |
|  | propylene glycol | 1.48 |
|  | glycerol | 0.98 |
|  | ethanol | 0.98 |
|  | Icilin | 0.01 |
|  | zeolites | 0.1 |
|  | spermidine | 3.94 |
| 13 | water | 89.37 |
|  | NaCl | 3.97 |
|  | propylene glycol | 1.49 |
|  | glycerol | 0.99 |
|  | ethanol | 0.99 |
|  | Icilin | 0.01 |
|  | zeolites | 0.2 |
|  | spermidine | 2.98 |
| 14 | water | 90.2 |
|  | NaCl | 4.00 |
|  | propylene glycol | 1.50 |
|  | glycerol | 1.00 |
|  | ethanol | 1.00 |
|  | Icilin | 0.005 |
|  | zeolites | 0.4 |
|  | spermidine | 2.00 |
| 15 | water | 90.1 |
|  | NaCl | 4.00 |
|  | propylene glycol | 1.5 |
|  | glycerol | 1.0 |
|  | ethanol | 1.0 |
|  | Icilin | 0.003 |
|  | zeolites | 0.4 |
|  | spermidine | 2.00 |

The results of cooling devices soaked in the various formulations and cooled to −40° C. are presented in the following table.

TABLE 2

Screening Results for cooling devices cooled to −40° C.

| Formulation No. | Starting Temperature (° C.) | Time out of freezer (hrs) | | | | | | | |
|---|---|---|---|---|---|---|---|---|---|
| | | 1 | 2 | 3 | 4 | 5 | 6 | 7 | 8 |
| Dry Ice | −79 | 10 | 13 | 13 | 15 | 15 | 16 | 17 | T |
| 1 | −40 | 8 | 10 | 15 | T | | | | |
| 2 | −40 | 8 | 10 | 16 | T | | | | |
| 3 | −40 | 8 | 11 | 17 | T | | | | |
| 4 | −40 | 9 | 12 | 18 | T | | | | |
| 5 | −40 | 9 | 12 | 18 | T | | | | |
| 6 | −40 | 9 | 13 | 19 | T | | | | |
| 7 | −40 | 9 | 13 | 19 | T | | | | |
| 8 | −40 | 9 | 13 | 18 | T | | | | |
| 9 | −40 | 10 | 13 | 19 | T | | | | |
| 10 | −40 | 10 | 13 | 17 | T | | | | |
| 11 | −40 | 9 | 12 | 15 | 15 | T | | | |
| 12 | −40 | 4 | 4 | 4 | 8 | 10 | 12 | 14 | T |
| 13 | −40 | 4 | 4 | 4 | 7 | 9 | 11 | 13 | T |
| 14 | −40 | 4 | 4 | 4 | 5.5 | 7 | 9 | 11 | T |
| 15 | −40 | 4 | 4 | 4 | 5.5 | 7 | 9 | 11 | T |
| 12A | −40 | 4 | 4 | 4 | 7 | 9 | 11 | 13 | T |
| 13A | −40 | 4 | 4 | 4 | 6 | 8 | 11 | 12 | T |
| 14A | −40 | 4 | 4 | 4 | 5.5 | 7 | 8 | 10 | T |
| 15A | −40 | 4 | 4 | 4 | 5 | 6 | 8 | 10 | T |
| 12B | −40 | 4 | 4 | 4 | 7 | 9 | 11 | 13 | T |
| 13B | −40 | 4 | 4 | 4 | 6 | 8 | 11 | 12 | T |
| 14B | −40 | 4 | 4 | 4 | 5.5 | 7 | 8 | 11 | T |
| 15B | −40 | 4 | 4 | 4 | 5 | 6 | 8 | 10 | T |
| 12C | −40 | 4 | 4 | 4 | 7 | 9 | 11 | 13 | T |
| 13C | −40 | 4 | 4 | 4 | 6 | 8 | 11 | 12 | T |
| 14C | −40 | 4 | 4 | 4 | 5.5 | 7 | 8 | 10 | T |
| 15C | −40 | 4 | 4 | 4 | 5 | 6 | 8 | 10 | T |

In the above table, the letter "T" indicates the experiment was terminated because the cooling device reached a temperature of 15° C. or higher. Moreover and in regard to formulations nos. 12 to 15, further variations were carried out on cooling devices soaked in these formulations.

For example, the letter "A" indicates that the substrate of the cooling device soaked in the particular formula was subsequently exposed to UV radiation for 2 mins.

The letter "B" indicates that the cooling device was exposed to pulsed UV radiation while being cooled to −40° C.

The letter "C" indicates that the cooling device was exposed to ionized air while being cooled to −40° C.

The results of cooling devices soaked in the various formulations and cooled to −80° C. are presented in the following table.

TABLE 3

Screening Results for cooling devices cooled to −80° C.

| Formulation No. | Starting Temperature (° C.) | Time out of freezer (hrs) | | | | | | | |
|---|---|---|---|---|---|---|---|---|---|
| | | 1 | 2 | 3 | 4 | 5 | 6 | 7 | 8 |
| Dry Ice | −79 | 10 | 13 | 13 | 15 | 15 | 16 | 17 | T |
| 1 | −80 | 7 | 9 | 14 | T | | | | |
| 2 | −80 | 7 | 9 | 15 | T | | | | |
| 3 | −80 | 7 | 10 | 16 | T | | | | |
| 4 | −80 | 8 | 11 | 16 | T | | | | |
| 5 | −80 | 8 | 11 | 16 | T | | | | |
| 6 | −80 | 8 | 11 | 18 | T | | | | |
| 7 | −80 | 8 | 12 | 18 | T | | | | |
| 8 | −80 | 8 | 12 | 17 | T | | | | |
| 9 | −80 | 9 | 12 | 18 | T | | | | |
| 10 | −80 | 9 | 12 | 16 | T | | | | |
| 11 | −80 | 8 | 11 | 13 | 15 | T | | | |
| 12 | −80 | 3 | 3 | 4 | 7 | 10 | 12 | 14 | T |
| 13 | −80 | 3 | 3 | 4 | 6 | 9 | 11 | 13 | T |
| 14 | −80 | 3 | 3 | 4 | 5 | 5 | 8 | 11 | T |
| 15 | −80 | 3 | 3 | 4 | 5 | 5 | 8 | 11 | T |
| 12A | −80 | 3 | 3 | 4 | 7 | 9 | 11 | 13 | T |
| 13A | −80 | 3 | 3 | 4 | 6 | 8 | 11 | 12 | T |
| 14A | −80 | 3 | 3 | 4 | 5 | 5 | 7 | 10 | T |
| 15A | −80 | 3 | 3 | 4 | 5 | 5 | 7 | 10 | T |
| 12B | −80 | 3 | 3 | 4 | 7 | 9 | 11 | 13 | T |
| 13B | −80 | 3 | 3 | 4 | 6 | 8 | 11 | 12 | T |
| 14B | −80 | 3 | 3 | 4 | 5 | 6 | 7 | 10 | T |
| 15B | −80 | 3 | 3 | 4 | 5 | 6 | 7 | 10 | T |
| 12C | −80 | 3 | 3 | 4 | 7 | 9 | 11 | 13 | T |
| 13C | −80 | 3 | 3 | 4 | 6 | 8 | 11 | 12 | T |
| 14C | −80 | 3 | 3 | 4 | 5 | 6 | 7 | 10 | T |
| 15C | −80 | 3 | 3 | 4 | 5 | 6 | 7 | 10 | T |

Again, in the above table, the letter "T" indicates the experiment was terminated because the cooling device reached a temperature of 15° C. or higher. Moreover and in regard to formulations nos. 12 to 15, further variations were again carried out on cooling devices soaked in these formulations.

The letter "A" indicates that the substrate of the cooling device soaked in the particular formula was subsequently exposed to UV radiation for 2 mins. The letter "B" indicates that the cooling device was exposed to pulsed UV radiation while being cooled to −40° C. The letter "C" indicates that the cooling device was exposed to ionized air while being cooled to −40° C.

Example 2: Cooling Device Testing

Testing was conducted to measure the cooling effect the cooling device has on an airplane food galley of aluminium construction and having dimensions of 800 mm length, 300 mm width and 900 mm height. The galley has a volume of 216 litres and has no insulation. The galley was fitted with a temperature probe (RC-4HC with 10 cm probe) and has been stocked with representative contents, including about 40% perishables and 60% water and alcoholic beverages.

The stocked galley was stored in a cold room for four hours at 2° C. before being left at room temperature to simulate transit of the galley to an aircraft. Thereafter, the galley was stored at about 22° C. to simulate an aircraft environment.

The galley was fitted with a cooling device of the present invention that has been soaked in a composition containing: 90 wt % water, 4 wt % NaCl, 2 wt % propylene glycol, 1 wt % glycerol, 1 wt % ethanol, 1.6 wt % spermidine bioreagent (>98%), 0.3997 wt % Zeolite and 0.003 wt % Icilin (>97%; HPLC), prior to being cooled to −80° C. for at least four hours.

A conventional dry ice cooling device was used as a comparative example.

The results are presented in the following table.

TABLE 4

| Description | Dry Ice | Cooling Device |
| --- | --- | --- |
| Galley Starting Temperature prior to being fitted with Dry Ice or Cooling Device | 25° C. | 27° C. |
| Time to drop under 10° C. | Less than 12 mins | Less than 10 mins |
| Time under 5° C. | 2 hours | 4 hours |
| Time under 10° C. | 2.5 hours | 7 hours |
| Time under 15° C. | 4.5 hours | 11 hours |

Example 3: In-Flight Cooling Device Testing

In-flight testing was conducted to measure the cooling effect the cooling device on an airplane food galley of aluminium construction and having dimensions of 800 mm length, 300 mm width and 900 mm height. The galley has a volume of 216 litres and has no insulation. The galley was fitted with a temperature probe (175T3 with external probe and air sensor) and has been stocked with typical aircraft food and beverage contents, including about 40% perishables and 60% water and alcoholic beverages.

The stocked galley was stored in a cold room for four hours at 2° C. before being fitted with the cooling device and transited to an aircraft flying an Australian domestic route between Sydney and Hobart.

The cooling device of the present invention has been soaked in a composition containing: 90 wt % water, 4 wt % NaCl, 2 wt % propylene glycol, 1 wt % glycerol, 1 wt % ethanol, 1.6 wt % spermidine bioreagent (>98%), 0.3997 wt % Zeolite and 0.003 wt % Icilin (>97%; HPLC), prior to being cooled to about −80° C. for at least four hours.

The galley when fitted with the cooling device maintained a temperature below 10° C. for the seven hour duration of the flight (6 am to 1 pm).

The invention claimed is:

1. A cooling device for use in keeping perishable products cool, said device comprising:
    a porous substrate soaked in a composition comprising at least one anti-freeze agent and at least one crosslinking agent; and
    a substrate cover for sealingly covering the porous substrate,
    wherein said porous substrate is UV irradiated prior to being sealingly covered with the substrate cover,
    wherein said cooling device is cooled to a desired temperature prior to use, and
    wherein said composition comprises spermidine as the at least one crosslinking agent, and further comprises icilin.

2. The device of claim 1, wherein the porous substrate is a phenolic foam.

3. The device of claim 1, wherein the at least one anti-freeze agent is selected from ethanol, methanol, ethylene glycol, propylene glycol, polyethylene glycol, glycerol, urea, one or more salts, or any combination thereof.

4. The device of claim 3, wherein the one or more salts are selected from the group consisting of NaCl, $CaCl_2$, $MgCl_2$, and KCl.

5. The device of claim 1, wherein the composition comprises NaCl, propylene glycol, glycerol and ethanol as anti-freeze agents.

6. The device of claim 1, wherein the composition further comprises an aluminosilicate agent.

7. The device of claim 6, wherein the composition comprises zeolite the aluminosilicate agent.

8. The device of claim 1, wherein the composition comprises, as the anti-freeze agent:
    from about 0.5 wt % to about 10 wt % NaCl;
    from about 0.1 wt % to about 5 wt % propylene glycol;
    from about 0.1 wt % to about 5 wt % glycerol; and
    from about 0.1 wt % to about 10 wt % ethanol.

9. The device of claim 1, wherein the composition comprises from about 0.1 wt % to about 5 wt % spermidine as the crosslinking agent; and from about 0.001 wt % to about 0.001 wt % icilin; and further comprises from about 0.1 wt % to about 0.5 wt % zeolite as an aluminosilicate agent.

10. A method of preparing a cooling device for use in keeping perishable products cool, said method comprising:
    soaking a porous substrate in a composition comprising at least one anti-freeze agent and at least one crosslinking agent;
    exposing said porous substrate to UV irradiation;
    sealing said porous substrate in a substrate cover to obtain a sealed substrate; and
    cooling said sealed substrate to a desired temperature prior to use,
    wherein said composition comprises spermidine as the at least one crosslinking agent, and further comprises icilin.

11. The method of claim 10, wherein the soaking includes immersing or impregnating the porous substrate with the composition until substantially saturated.

12. The method of claim 10, wherein the exposing occurs for a period of time ranging from about 30 mins to about 4 hours.

13. The method of claim 10, wherein the porous substrate is soaked in the composition until it is saturated.

14. The method of claim 10, wherein the cooling comprises cooling to a temperature at which the sealed substrate soaked in the composition undergoes a phase transition into a substantially solid state.

15. The method of claim 10, wherein the cooling comprises rapidly cooling so that the sealed substrate undergoes a phase transition to a non-crystalline amorphous solid.

16. The method of claim 10, wherein the sealed substrate is exposed to further UV irradiation during the cooling.

\* \* \* \* \*